(12) United States Patent
Akiyama et al.

(10) Patent No.: US 6,606,911 B2
(45) Date of Patent: Aug. 19, 2003

(54) PRESSURE SENSORS

(75) Inventors: Morito Akiyama, Tosu (JP); Masahiro Kinoshita, Kyoto (JP); Hideyuki Bingo, Kyoto (JP); Makoto Nakamura, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/006,783

(22) Filed: Dec. 5, 2001

(65) Prior Publication Data

US 2002/0078756 A1 Jun. 27, 2002

(30) Foreign Application Priority Data

Dec. 27, 2000 (JP) .......................................... 2000-397477

(51) Int. Cl.⁷ ................................................ G01L 9/12
(52) U.S. Cl. ........................ 73/718; 73/720; 361/283.4; 324/663
(58) Field of Search ........................... 73/718, 715–717, 73/720–724; 361/283.4; 324/658, 663

(56) References Cited

U.S. PATENT DOCUMENTS 4,495,820 A * 1/1985 Shimada et al. .............. 73/724
5,616,844 A * 4/1997 Suzuki et al. ............. 73/514.32

FOREIGN PATENT DOCUMENTS

| JP | 7-55615 | 3/1995 | | |
| JP | 7-228969 | 8/1995 | | |
| JP | 07-228969 | * 8/1995 | ........... | C23C/14/34 |

* cited by examiner

Primary Examiner—Hezron Williams
Assistant Examiner—Jermaine Jenkins
(74) Attorney, Agent, or Firm—Beyer Weaver & Thomas LLP

(57) ABSTRACT

A pressure sensor is formed by sandwiching a pressure-sensitive dielectric membrane between and in contact with a pair of electrodes. As pressure is applied, the dielectric constant of the pressure-sensitive membrane changes while the distance of separation between the pair of electrodes remains constant. This change in the dielectric constant is detected by a circuit as a change in the electrostatic capacitance between the electrodes to measure the applied pressure. Since the pressure-sensitive dielectric membrane is not required to undergo any elastic deformation for measuring the pressure, the pressure sensor can be made extremely thin.

19 Claims, 5 Drawing Sheets

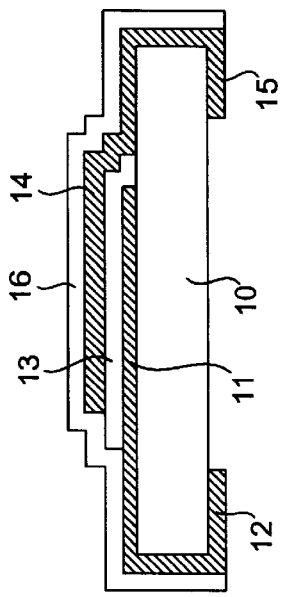
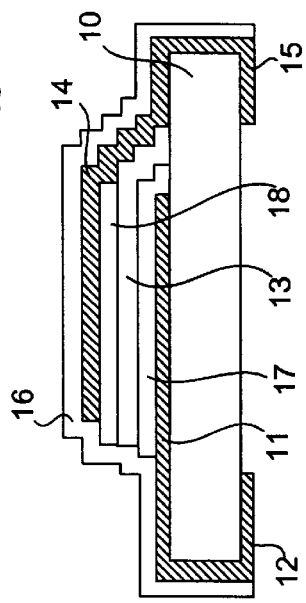
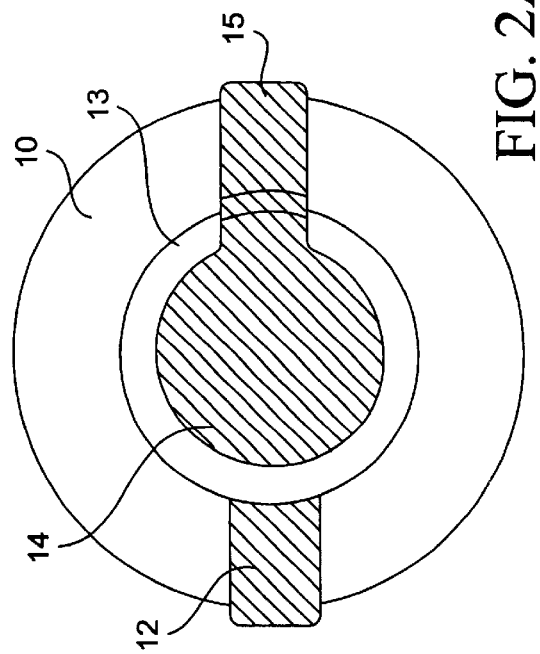
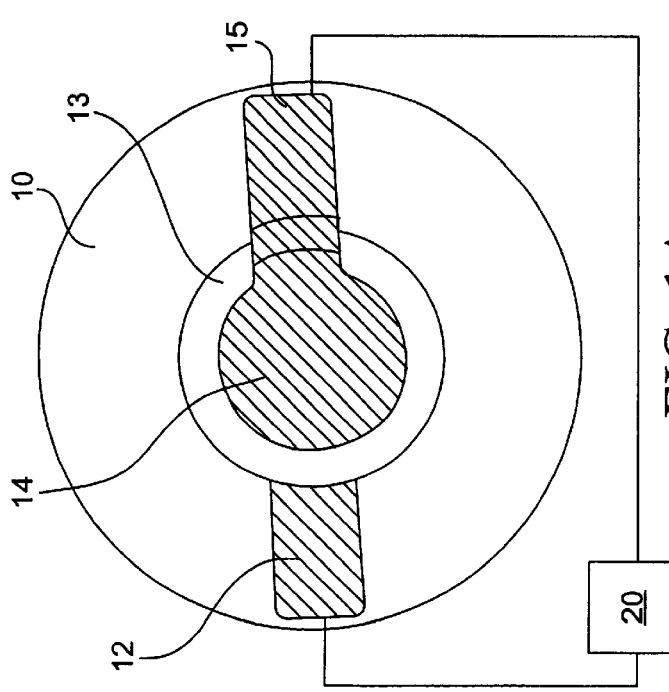
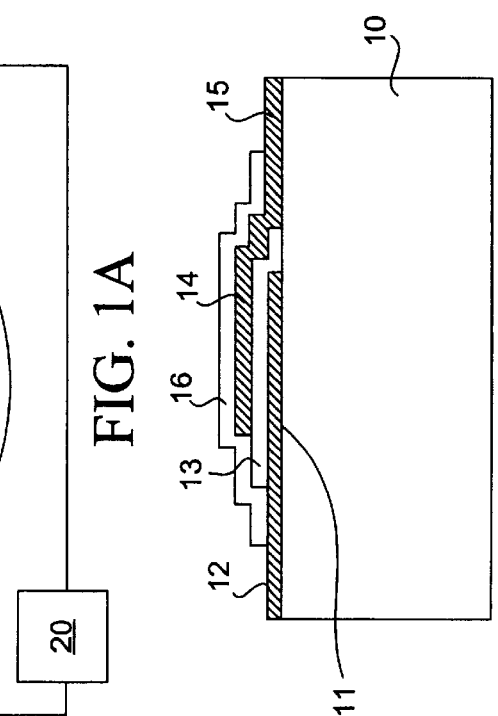

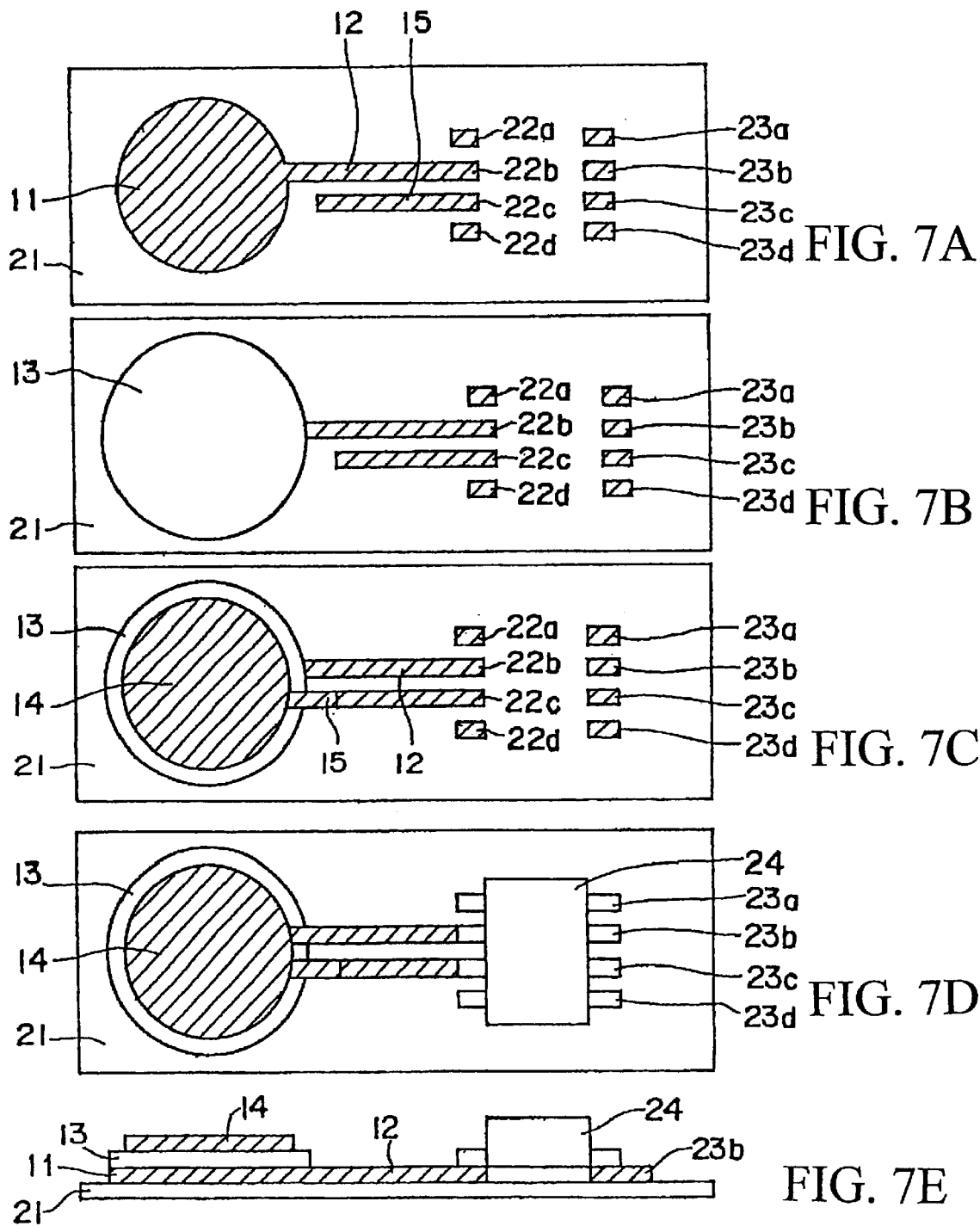

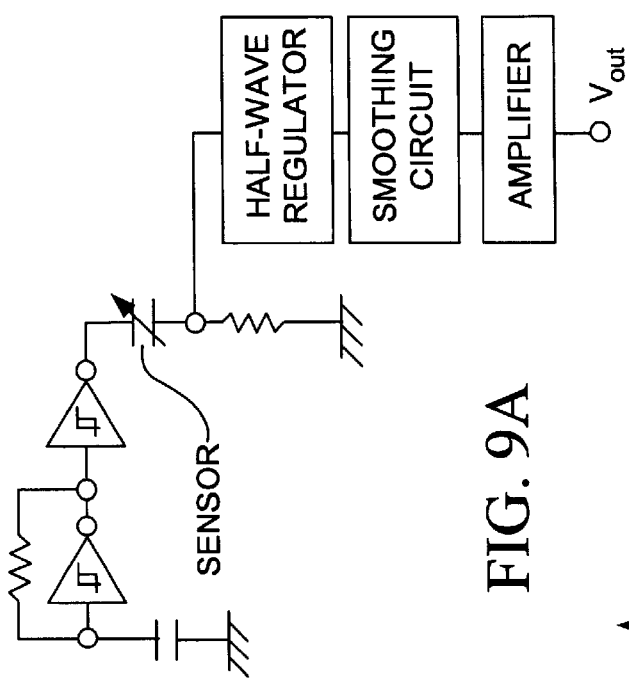
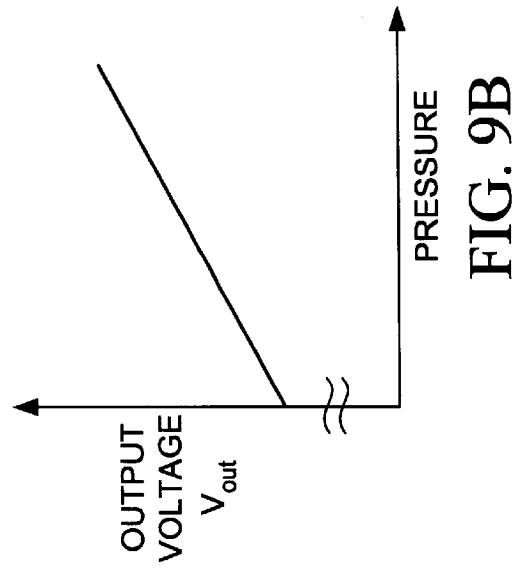
FIG. 9A
FIG. 9B
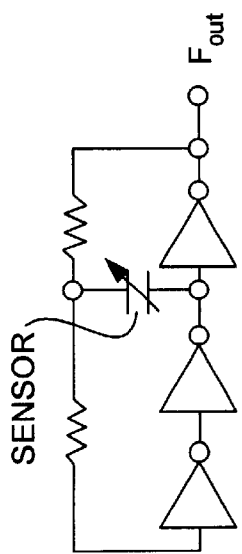
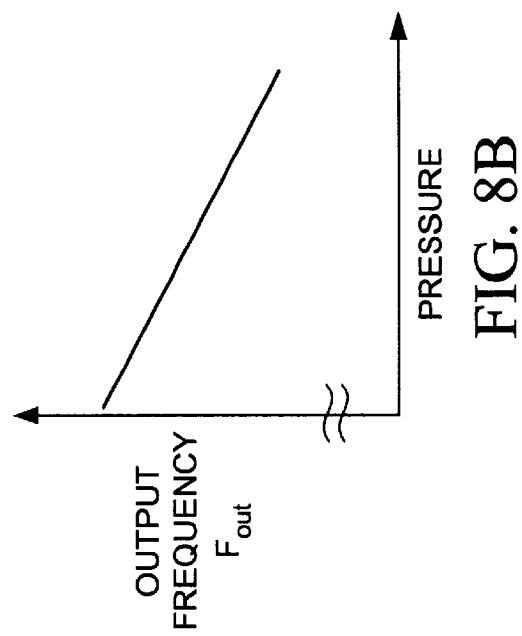
FIG. 8A
FIG. 8B

US 6,606,911 B2

PRESSURE SENSORS

BACKGROUND OF THE INVENTION

This invention relates to pressure sensors and more particularly to extremely thin pressure sensors of the so-called electrostatic capacitor type.

Japanese Patent Publication Tokkai 7-55615 disclosed a pressure sensor of this type, having an elastic planar dielectric member between the electrodes of a capacitor element. As a pressure is applied to such a pressure sensor and the dielectric member undergoes an elastic deformation, the distance of separation between the electrodes changes, causing the electrostatic capacitance of the capacitor to also change. A pressure change can thus be detected by measuring this change in electrostatic capacitance.

Prior art pressure sensors of this type are required to have a certain substantial thickness, however, because the detection of pressure depends on the elastic deformation of the dielectric member in the direction of its thickness. As the dielectric member is deformed, furthermore, the electrode on the pressure-receiving side is also deformed. As material fatigue accumulates, the useful lifetime of the sensor is adversely affected.

Moreover, dielectric constants of elastic dielectric materials tend to vary with temperature, and their characteristics are unstable. If means for eliminating the effects of temperature variations must be introduced, the sensor structure becomes complicated and adversely affects the production cost.

SUMMARY OF THE INVENTION

It is therefore an object of this invention, in view of the problems of the prior art technology described above, to provide extremely thin pressure sensors which are simple in structure but high in durability.

Pressure sensors embodying this invention may be characterized as comprising a pressure-sensitive membrane, of which the dielectric constant changes with pressure, stacked and sandwiched between and in contact with a pair of mutually oppositely facing electrodes with a constant separation. Extremely thin pressure sensors can be obtained according to this invention since elastic deformation in the direction of thickness is no longer involved. Since there is no part which undergoes any elastic deformation, furthermore, there is no problem of material fatigue and hence the durability of the sensor improves. Moreover, there is no need to use an elastic dielectric material which is sensitive to external temperature variations. Thus, this invention can provide pressure sensors with a simple structure which are easy to manufacture.

One of the pair of electrodes may be placed on a surface of a ceramic base plate or a flexible film in a layered formation. Thus, this invention can provide pressure sensors which are easy to use, depending on circumstances.

BRIEF DESCRIPTION OF THE DRAWINGS

FIG. 1A is a plan view and FIG. 1B is a sectional view of a pressure sensor according to a first embodiment of this invention;

FIG. 2A is a plan view and FIG. 2B is a sectional view of a pressure sensor according to a first embodiment of this invention, FIG. 2C is a sectional view of a variation of the pressure sensor of FIG. 2B;

FIGS. 7D and 7E are a plan view and a sectional view of a pressure sensor according to a seventh embodiment of this invention and FIGS. 7A, 7B and 7C are its plan views at different stages of its production;

FIG. 8A is a schematic diagram of an example of the circuit shown in FIG. 1 for outputting the result of measurement as a function of frequency and FIG. 8B is a graph for schematically showing the relationship between the frequency measured by the circuit of FIG. 8A and pressure; and FIG. 9A is a schematic diagram of another example of the circuit shown in FIG. 1 for outputting the result of measurement as a function of voltage and FIG. 9B is a graph for schematically showing the relationship between the voltage measured by the circuit of FIG. 9A and pressure.

Throughout herein, like components are indicated by the same numerals and may not necessarily be explained repetitiously. The circuit for measuring electrostatic capacitor is omitted from FIGS. 2–7 for simplicity.

DETAILED DESCRIPTION THE INVENTION

Figure 4A:
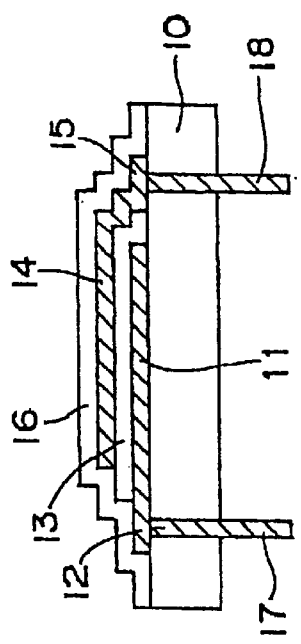
FIG. 4A is a plan view and FIG. 4B is a sectional view of a pressure sensor according to a first embodiment of this invention.

The invention is described next by way of examples with reference to FIGS. 1–7.

FIGS. 1A and 1B show a pressure sensor according to a first embodiment of this invention, formed on top of a ceramic base member 10. A first electrode 11, a pressure-sensitive membrane 13 and a second electrode 14 are sequentially stacked one on top of another in mutually contacting relationship at the center of a surface of the base member 10, and are thereafter covered by a protective membrane 16 (not shown in FIG. 1A).

The base member 10 may comprise a monocrystalline ceramic material, a polycrystalline ceramic material (such as $MoSi_2$, $Al_2O_3$, SiC, and $Si_3N_4$) or an inorganic material such as glass. The base member 10 need not be a plate but may comprise a metallic film or a resin film. Examples of a metallic film include films of a stainless steel, a copper alloy such as phosphor bronze, aluminum and titanium. Examples of a resin film include films of polyimide, polyethylene terephthalate, polycarbonate and polyphenylene sulfide.

The first electrode 11 serves as a part of a capacitor element and is selected in view of its affinity with the base member 10 and the pressure-sensitive membrane 13. It may comprise Cr, Au, Cu, Ag, Al and Ta, as well as an alloy such as AgNi. It may be formed by printing, a thin-film process, sputtering, vapor deposition and ion plating.

The pressure-sensitive membrane 13 is of a material of which dielectric constant changes according to pressure, such as AlN, GaN, InN, NbN and TaN. It need not be made of a single material. Materials as mentioned above may be combined or stacked, according to given requirements. Its thickness does not limit the scope of the invention, and may be 1 $\mu$m–10 $\mu$m and preferably 2 $\mu$m–5 $\mu$m. If it is thinner than 1 $\mu$m, it maynot be found to be sufficiently well insulating. If it is thicker than 10 $\mu$m, it affects the electrostatic capacitance adversely and the production cost increases. A thickness in the range of 3–5 µm is particularly preferred if AlN is used for the pressure-sensitive membrane. If it is thinner than 3 µm, pinholes tend to be generated to cause insufficient insulation. If it is thicker than 5 µm, the electrostatic capacitance becomes too small and its production cost increases.

The production method of the pressure-sensitive membrane 13 is not intended to limit the scope of the invention. It may be formed by sputtering, ion-plaiting, CVD or PVD.

The second electrode 14, like the first electrode 11, forms a part of the capacitor element and may be formed with the same material and by the same method as the first electrode 1, but it is not necessary to be formed with the same material or by the same method, depending on the circumstances.

The protective membrane 16 may comprise a resin material such as polyimide, glass or $SiO_2$. It is to be noted that terminal parts of lead wires 12 and 15 for the first and second electrodes 11 and 14 are not covered by the protective membrane 16.

While there is no external pressure applied to the pressure sensor, the dielectric constant of the pressure-sensitive membrane 13 is constant and its electrostatic capacitance is also constant. As a specified external pressure is applied to the protective membrane 16, the dielectric constant changes according to its electrostatic capacitance. Thus, the external pressure can be detected by measuring the electrostatic capacitance. In FIGS. 1A and 1B, numeral 20 schematically represents a circuit of a known kind for measuring the electrostatic capacitance.

FIGS. 2A and 2B show a second embodiment of the present invention, which is similar to the first embodiment described above, different therefrom in that the lead lines 12 and 15 of the first and second electrodes 11 and 14 are extended to the bottom surface of the base member 10 and that the protective membrane 16 covers the entire sensor except the bottom surface of the base member 10. This embodiment is advantageous in that it is surface-mountable and hence its assembly is easy. FIG. 2C is a variation to the second embodiment described above, different therefrom in that an electrically insulating layer 17 is inserted between the first electrode 11 and the pressure-sensitive membrane 13 and another electrically insulating layer 18 is inserted between the second electrode 14 and the pressure-sensitive membrane 13. This variation is advantageous in that the electrodes 11 and 14 are more dependably insulated from each other.

Figure 3A:
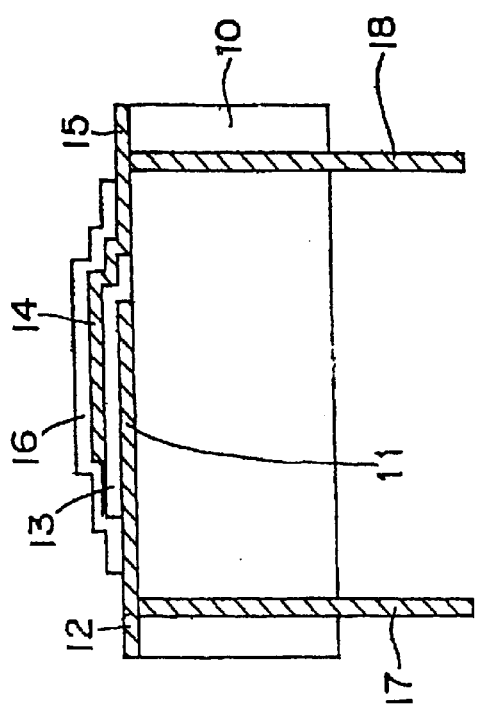
FIG. 3A is a plan view and FIG. 3B is a sectional view of a pressure sensor according to a first embodiment of this invention.
Figure 3B:
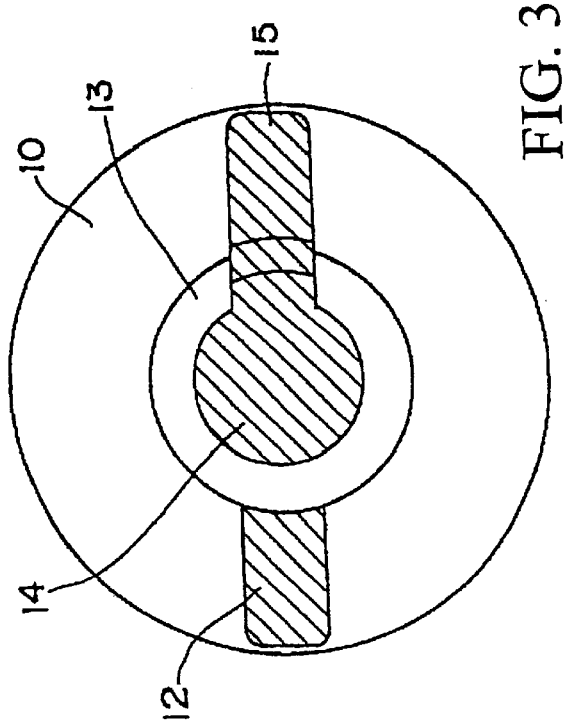

FIGS. 3A and 3B show a third embodiment of the invention, which is similar to the first embodiment described above, different therefrom in that a pair of connector terminals 17 and 18 penetrates the base member 10 and is connected respectively to the lead lines 12 and 15 of the first and second terminals 11 and 14. This embodiment is advantageous in that the sensor element can be handled like a multi-purpose lead component such that all constituent components can be assembled from one side.

Figure 4B:
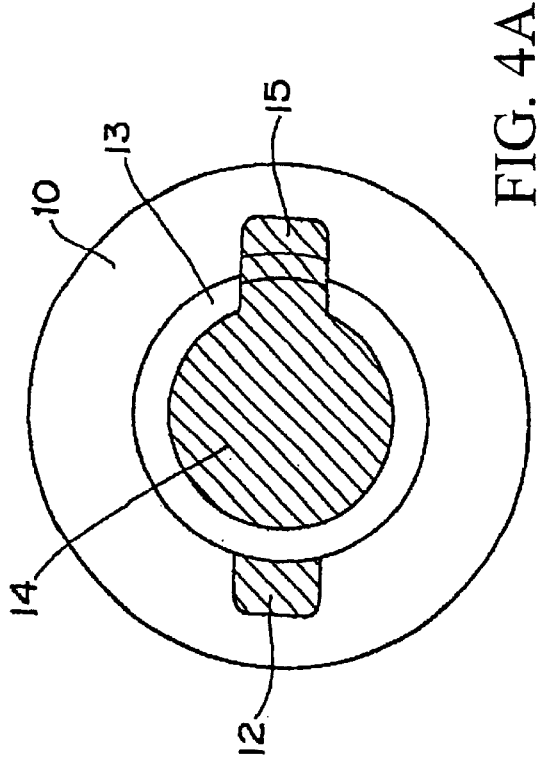

FIGS. 4A and 4B show a fourth embodiment of the invention, which is similar to the third embodiment described above, different therefrom in that the upper surface of its base member 10 is entirely covered by the protective membrane 16. Since the bottom ends of the connector terminals 17 and 18 protrude from the bottom surface of the base member 10, a pressure sensor with a dependable insulating characteristic can be obtained by mounting onto a printed circuit board.

Figure 5A:
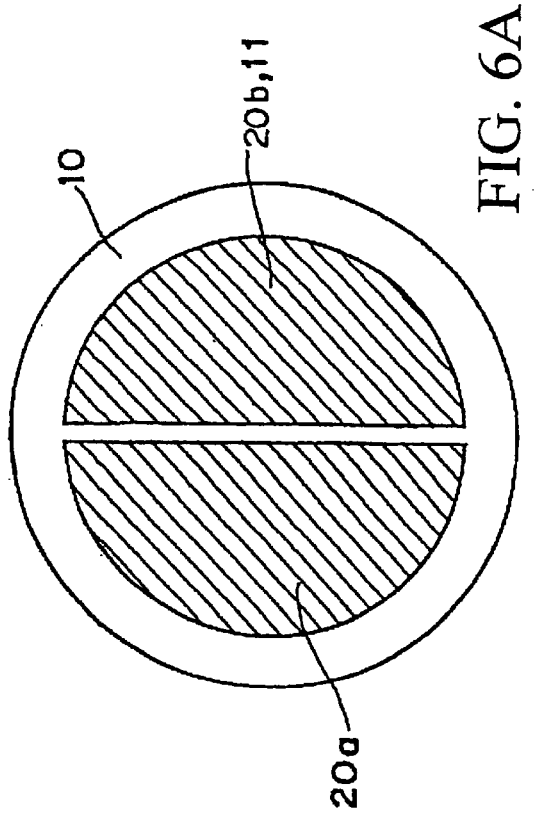
FIG. 5A is a plan view and FIG. 5B is a sectional view of a pressure sensor according to a first embodiment of this invention.
Figure 5B:
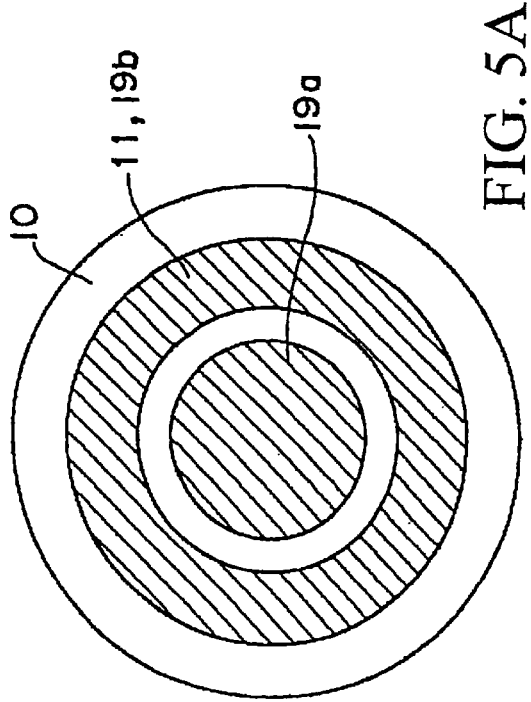

FIGS. 5A and 5B show a fifth embodiment of the invention characterized as having its first electrode 11 consisting of a circular central electrode 19a and an annular electrode 19b which are concentric to each other. A pair of connector terminals 18 and 17 respectively connects to the central electrode 19a and the annular electrode 19b. The sizes of the central and annular electrodes 19a and 19b as well as their ratio may be appropriately varied. This embodiment is advantageous in that the shape of the second electrode 14 becomes simpler because the connector terminals 18 and 17 can be connected respectively to the central electrode 19a and the annular electrode 19b which are both formed on the same surface such that the production process becomes easier. Since the functional relationship between the pressure and the dielectric constant becomes linear, it is easier for the measurement of pressure.

Figure 6A:
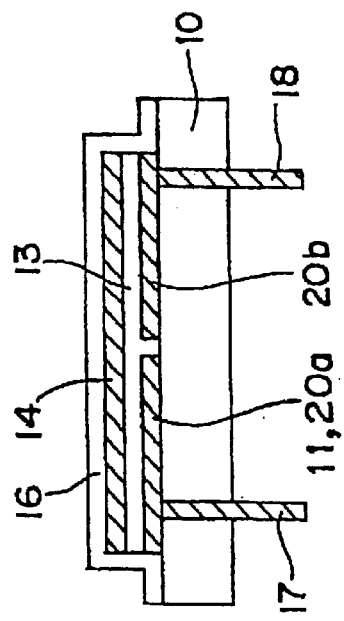
FIG. 6A is a plan view and FIG. 6B is a sectional view of a pressure sensor according to a first embodiment of this invention.
Figure 6B:
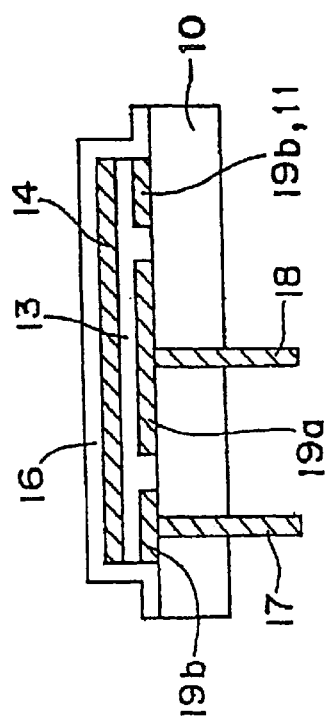

FIGS. 6A and 6B show a sixth embodiment characterized wherein the first electrode 11 is formed as a pair of semi-circular divided electrodes 20a and 20b. This embodiment is advantageous in that it can be produced easily because a pair of connector terminals 17 and 18 can be connected to the first electrode 11 without making its shape complicated.

FIGS. 7D and 7E show a seventh embodiment characterized as having both a pressure sensor and an IC component 24 mounted onto a surface of a film-like base member 21 and connected together. To produce such a sensor, a first electrode 11, lead lines 12 and 15 and connector pads 22a, 22b, 22c, 22d, 23a, 23b, 23c and 23d (or 22a–22d and 23a–23d) are formed on the surface of a rectangular planar base member made of a polyimide film as shown in FIG. 7A. Next, a pressure-sensitive membrane 13 of a strong dielectric material such as AlN is formed by sputtering on the upper surface of the first electrode 11 as shown in FIG. 7B. Thereafter, a second electrode 14 is formed on the surface of this pressure-sensitive membrane 13 and this second electrode 14 is connected to the lead line 15 as shown in FIG. 7C. Still thereafter, connector terminals of the IC component 24 are electrically connected individually to the connector pads 22a–22d and 23a–23d, as shown in FIGS. 7D and 7E.

This embodiment is advantageous in that pressure within a normally inaccessible space or inside a sealed space can be detected easily. It may be used, for example, for measuring the pressure inside an automobile tire or may be installed inside a wrist watch to measure the external atmospheric pressure and to have it displayed.

The circuit for outputting the result of measurement of pressure by a sensor of this invention was only schematically shown in FIG. 1 by numeral 20. FIG. 8A shows an example of such a circuit for outputting frequency $F_{out}$ as an indicator of pressure sensed by the pressure-sensitive membrane 13 of the sensor. As shown in FIG. 8B, the outputted frequency $F_{out}$ decreases as the sensed pressure increases. FIG. 9A shows another example of a circuit for outputting voltage $V_{OUT}$ as an indicator of pressure sensed by the pressure-sensitive membrane 13 through a half-wave regulator circuit, a smoothing circuit for smoothing the waveform and an amplifier circuit. As shown in FIG. 9B, the outputted voltage Vout decreases increases as the sensed pressure increases.

The invention has been described above with reference to only a limited number of examples, but these examples are not intended to limit the scope of the invention. Many modifications and variations are possible within the scope of the invention in which extremely thin pressure sensors can be obtained without regard to any elastic deformation in the direction of the thickness of the sensor. Since there is no component required to undergo any elastic deformation, unlike pressure sensors of a prior art type, mechanical material fatigue does not accumulate in the electrodes which sandwich the dielectric member in between and the separation therebetween remains constant. Without the use of any elastic dielectric material, effects of ambient temperature need not be taken into consideration and pressure sensors with a simple structure can be produced inexpensively according to this invention.

What is claimed is:

1. A pressure sensor comprising:

a pair of electrodes consisting of a first electrode and a second electrode;

a single pressure-sensitive dielectric membrane sandwiched between and in contact with both of said pair of electrodes, said pressure-sensitive membrane having a dielectric constant which varies according to pressure; and means for measuring capacitance without changing distance between said pair of electrodes and thereby detecting pressure on said pair of electrodes.

2. The pressure sensor of claim 1 further comprising a ceramic base member, said first electrode forming a layer contacting a surface of said ceramic base member.

3. The pressure sensor of claim 2 further comprising lead wires each contacting a corresponding one of said pair of electrodes.

4. The pressure sensor of claim 3 wherein said lead wires penetrate and protrude from said base member.

5. The pressure sensor of claim 2 wherein said first electrode has a circular part and an annular part disposed in a concentric relationship.

6. The pressure sensor of claim 5 further comprising a pair of lead wires which penetrate and protrude from said ceramic member, one of said lead wires being connected to said circular part and the other of said lead wires being connected to said annular part.

7. The pressure sensor of claim 2 wherein said first electrodes has a pair of semi-circular parts disposed opposite each other on said ceramic member.

8. The pressure sensor of claim 7 further comprising a pair of lead wires which penetrate and protrude from said ceramic member, each of said lead wires being connected to a corresponding one of said semi-circular parts.

9. The pressure sensor of claim 2 wherein said pressure-sensitive membrane consists of one or more selected from the group consisting of AlN, GaN, InN, NbN and TaN and has thickness 1 $\mu$m–10 $\mu$m.

10. The pressure sensor of claim 2 wherein said pressure-sensitive membrane consists of one or more selected from the group consisting of AlN, GaN, InN, NbN and TaN and has thickness 2 $\mu$m–5 $\mu$m.

11. The pressure sensor of claim 1 further comprising a flexible film, said first electrode forming a layer contacting a surface of said flexible film.

12. The pressure sensor of claim 11 wherein said pressure-sensitive membrane consists of one or more selected from the group consisting of AlN, GaN, InN, NbN and TaN and has thickness 1 $\mu$m–10 $\mu$m.

13. The pressure sensor of claim 11 wherein said pressure-sensitive membrane consists of one or more selected from the group consisting of AlN, GaN, InN, NbN and TaN and has thickness 2 $\mu$m–5 $\mu$m.

14. The pressure sensor of claim 1 further comprising lead wires each contacting a corresponding one of said pair of electrodes.

15. The pressure sensor of claim 1 further comprising a protective layer covering at least said second electrode.

16. The pressure sensor of claim 1 further comprising a protective layer covering said second electrode and portions of said ceramic member.

17. The pressure sensor of claim 1 wherein said pressure-sensitive membrane consists of one or more selected from the group consisting of AlN, GaN, InN, NbN and TaN and has thickness 1 $\mu$m–10 $\mu$m.

18. The pressure sensor of claim 1 wherein said pressure-sensitive membrane consists of one or more selected from the group consisting of AlN, GaN, InN, NbN and TaN and has thickness 2 $\mu$m–5 $\mu$m.

19. A pressure sensor comprising:

a pair of electrodes consisting of a first electrode and a second electrode;

a pressure-sensitive dielectric membrane sandwiched between and in contact with both of said pair of electrodes, said pressure-sensitive membrane having a dielectric constant which varies according to pressure; and means for measuring capacitance without changing distance between said pair of electrodes and thereby detecting pressure on said pair of electrodes.

* * * * *